No. 744,875. PATENTED NOV. 24, 1903.
W. NEUMEIER, Jr.
VEHICLE COUPLING.
APPLICATION FILED JULY 23, 1903.
NO MODEL.
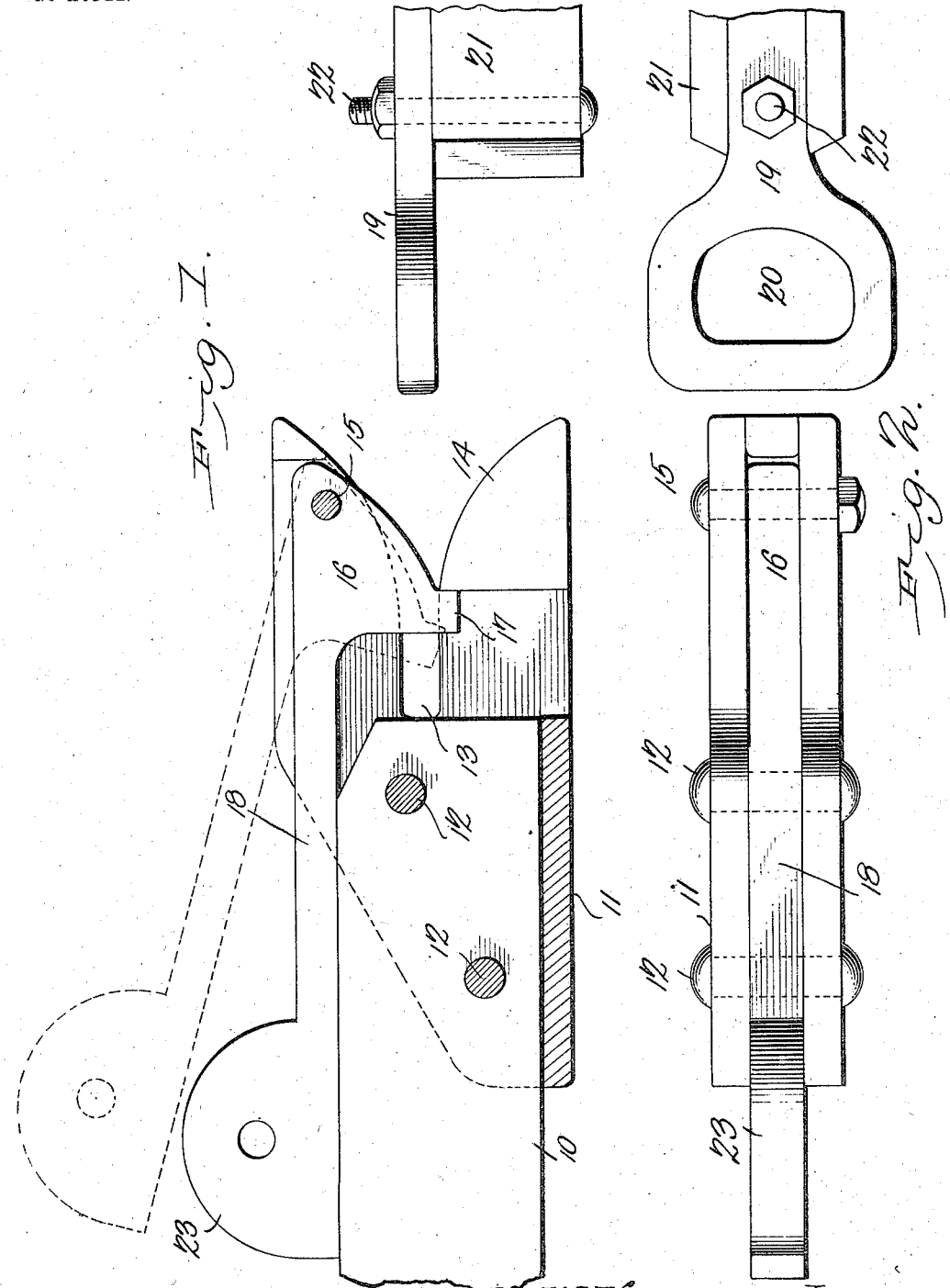
Witnesses
W. Neumeier, Jr., Inventor.
by
Attorneys No. 744,875.

Patented November 24, 1903.

UNITED STATES PATENT OFFICE.

WILLIAM NEUMEIER, JR., OF DURANT, IOWA.

VEHICLE-COUPLING.

SPECIFICATION forming part of Letters Patent No. 744,875, dated November 24, 1903.

Application filed July 23, 1903. Serial No. 166,764. (No model.)

*To all whom it may concern:*

Be it known that I, WILLIAM NEUMEIER, Jr., a citizen of the United States, residing at Durant, in the county of Cedar and State of Iowa, have invented a new and useful Vehicle-Coupling, of which the following is a specification.

This invention relates to devices employed for coupling vehicles of various kinds, as well as machinery mounted upon wheels, such as threshing-machines, hay-loaders, portable sawing-machines, and, in fact, any portable machines, whether drawn by horses, by traction-engines, or by other power.

The object of the invention is to simplify and improve devices of the character specified by producing a device which will operate automatically and entirely by gravity, which may be quickly and easily uncoupled when required, but which cannot be accidentally uncoupled, and which may afford support for a draft member.

In attaining the objects above mentioned I employ the novel construction and combination of parts hereinafter shown, described, and specified in the claims.

In the drawings illustrative of the invention, in which corresponding parts are denoted by like designating characters, Figure 1 is a sectional side elevation, and Fig. 2 is a plan view of the device.

The improved devices may be attached to any suitable part of the vehicles to be transported; but one part will preferably be connected to the draft-tongue end of one vehicle and the other part to the other vehicle at some convenient part, and for the purpose of illustration the two main separable portions are shown thus arranged, although the order might be reversed without departing from the principle of the invention.

A portion of a draft-tongue is represented at 10, and to the free end of this member a shell or casing 11 is connected in any suitable manner. Preferably the shell is hollow and the end of the tongue inserted therein and bolted fast, as shown at 12.

In the outer end of the shell 11 a transverse slot 13 is formed with outwardly-curving side walls to provide for the ready entrance of the coupling member attached to the other vehicle, as hereinafter shown.

The shell member 11 is formed with a stop 14 at one side of the recess 13 and spaced from its inner end, as shown.

Pivoted at 15 between the side members of the shell 11 at the opposite side of the recess 13 from the stop 14 is a latch member 16, having a shoulder 17, engaging the stop 14, and with an operating-arm 18 extending therefrom and resting upon the upper surface of the tongue member 10, as shown, when the latch is closed, as in Fig. 1.

The coupling member is represented at 19 and is provided with an aperture 20 and will be attached in any suitable manner to the other vehicle, but preferably to a draft-tongue or coupling-bar 21 by bolts or rivets 22, as shown. By this arrangement it will be obvious that the member 19 when thrust into the recess 13 will displace the latch member and pass beneath it, allowing the free end of the latter to drop by gravity into the aperture 20 after the member 19 has passed, and thus complete the coupling.

The member 18 is relatively long and will be enlarged at its free end, as at 23, to increase its weight, so that it becomes a "gravity-latch" to act quickly and positively.

It will be noted that the pivot-pin 15 is located considerably in advance of the stop 14, which improves the action and increases the safety of the coupling. It improves the coupling action by decreasing the power required to open the latch when the member 19 enters and increases the safety by requiring an increased rearward movement of the inner surface of the latch before the latter can be withdrawn.

The location of the pivot-pin 15 in the position shown also materially increases the safety of the coupling by causing a strong downward pressure against the stop 14 when the strain is applied, thus effectually counteracting any tendency of the latch to move upwardly and release itself.

The member 18, as above noted, rests upon the member 10, which thereby materially aids in supporting the latch member and relieves the pin 15 from a large portion of the strain.

The parts will be of metal of sufficient strength to withstand the strains to which they will be subjected and may be increased or decreased, as required, to adapt them to the work required.

Having thus described my invention, what I claim is—

1. In a device of the character described, a shell or casing having a transverse slot in one end and having a stop at the bottom of said slot, a latch member pivoted in said shell at the top of the slot and in advance of said stop, said latch member extending across the slot and engaging with said stop and having a releasing-arm extending therefrom, and a coupling member of greater width than said shell and having an aperture to receive said latch.

2. In a device of the character described, a shell or casing having a transverse slot in one end and provided with a stop at the bottom of said slot, a latch member pivoted in said shell, said latch member extending across said slot and having a shoulder for engagement with said stop and having a releasing-arm extending rearward beyond said shell, and a coupling member of greater width than said shell adapted to fit said slot and having an aperture to receive said latch member.

3. In a device of the class described, the combination with a draft-tongue, of a shell or casing having a transverse slot in one end with a flaring mouth, said slot being provided in the bottom with a stop, a latch member pivoted in said shell at the upper side of the slot and in advance of said stop, said latch member extending across the slot and having a shoulder for engagement with said stop, a weight-releasing arm extending rearward from said latch member and resting upon said draft-tongue, and a coupling member of greater width than said shell adapted to enter said slot and having an aperture to receive said latch member.

In testimony that I claim the foregoing as my own I have hereto affixed my signature in the presence of two witnesses.

WM. NEUMEIER, JR.

Witnesses:
D. H. SNOKE,
F. LANGFELDT.